Figure 1:
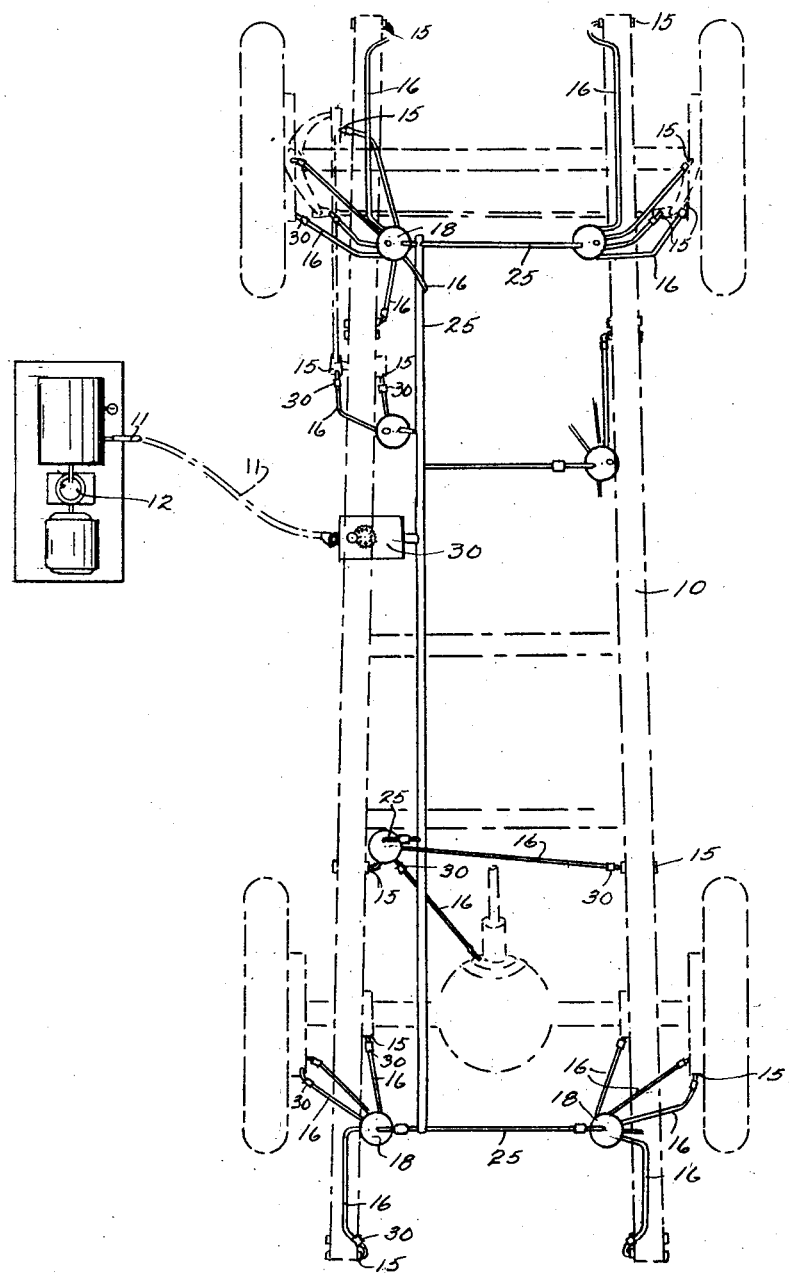

Sept. 27, 1932.  H. CHISHOLM  1,879,086
LUBRICATING SYSTEM
Filed May 7, 1929  3 Sheets-Sheet 1

Inventor
Henry Chisholm
By Bates, Goldrick & Teare
Attorneys

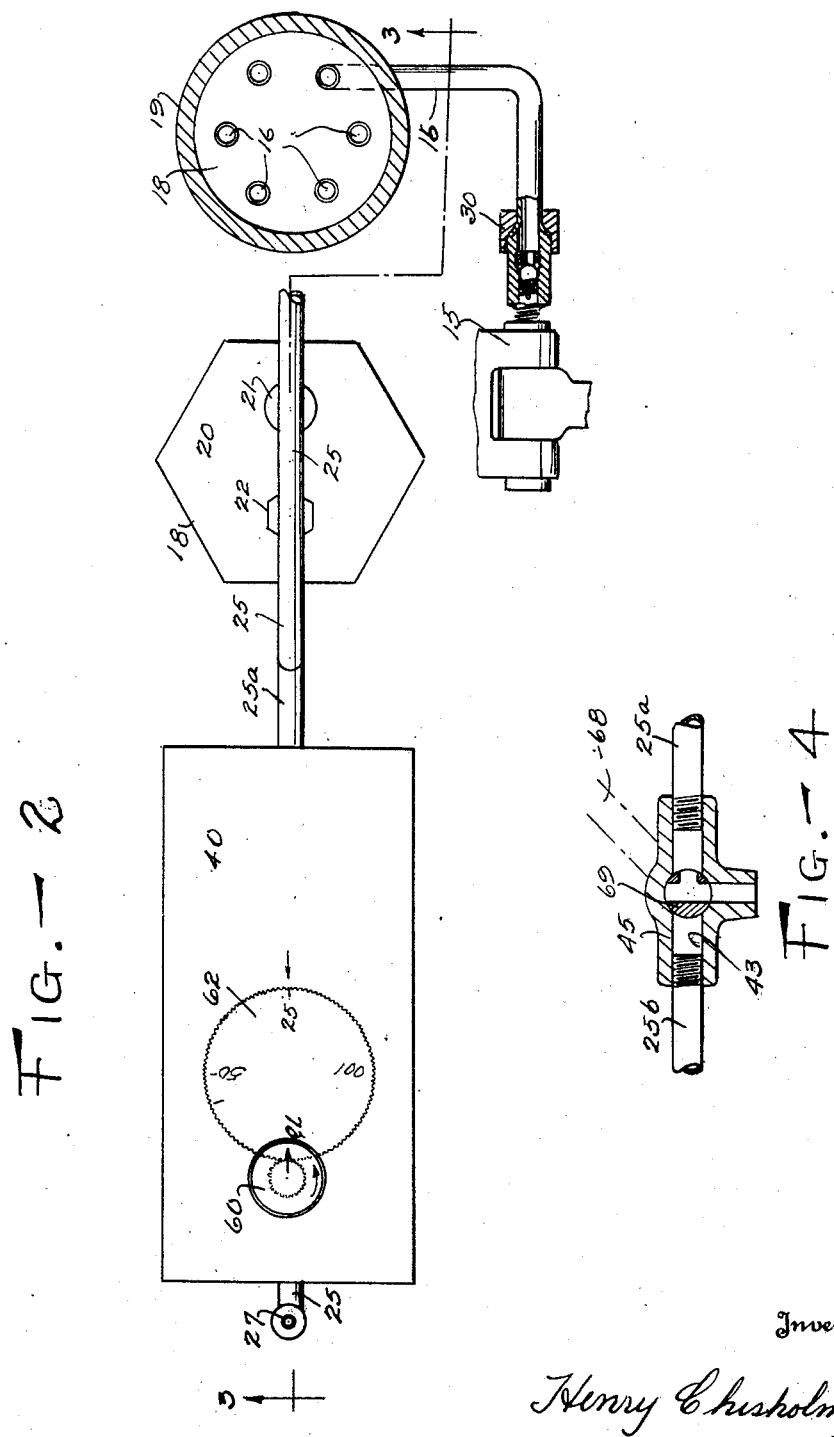

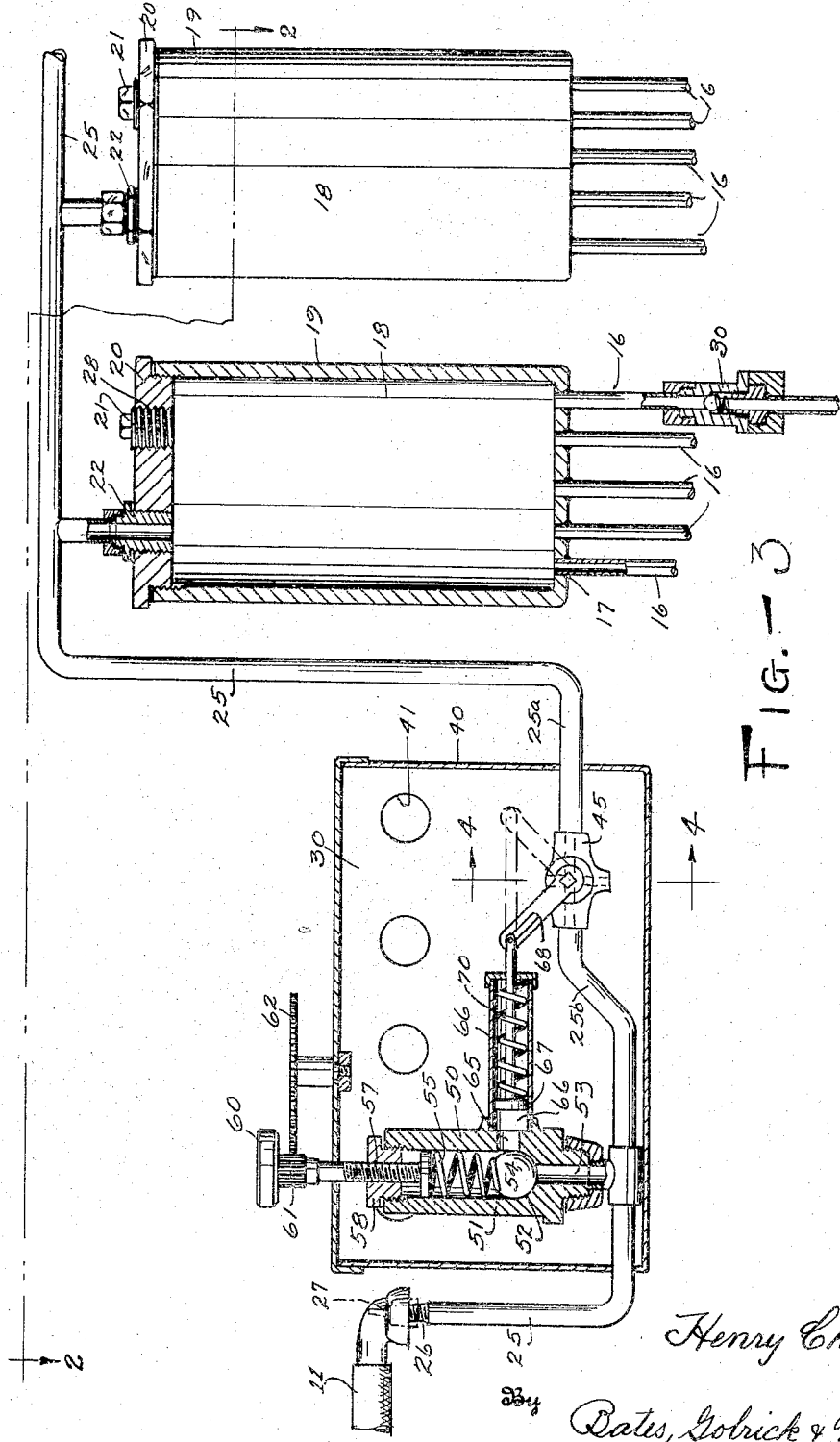

Patented Sept. 27, 1932

1,879,086

UNITED STATES PATENT OFFICE

HENRY CHISHOLM, OF CLEVELAND, OHIO

LUBRICATING SYSTEM

Application filed May 7, 1929. Serial No. 361,147.

This invention relates to lubricating systems for lubricating a plurality of bearings, and is particularly adapted for use in lubricating bearings on automobiles.

One of the objects of this invention is to provide a lubricating system which can readily utilize the air pressure systems found in the usual gasolene service stations, for causing expulsion of the lubricant to the car bearings.

Another object is to provide a lubricating system for feeding a specified amount of lubricant to each bearing. A further object is to provide a lubricating system which obviates the use of excessive pressures.

In the drawings, Fig. 1 is a plan of such lubricating system embodied in automobile chassis; Fig. 2 is a plan of the controlling mechanism taken along lines 2—2 of Figure 3; Fig. 3 is a cross section indicated by the line 3—3 of Fig. 2; Fig. 4 is a vertical section on the lines 4—4 of Fig. 3.

Referring to the drawings, 10 indicates an automobile chassis having bearings 15. Leading from the bearings are oil supply lines 16, which communicate with oil reservoirs 18. A pressure line 25 connects the oil reservoirs to a pressure control apparatus generally indicated at 30.

A pressure inlet line 26 leads to the control mechanism and is conveniently located on the chassis in such a manner as to be readily accessible for connection with the service station supply line 11 much in the same manner as is pursued for the inflation of tires. An air compressor unit is indicated at 12.

The oil reservoirs 18 consist of casings 19 having threaded caps 20 which carry plugs 21 and a bushing 22 adapted to receive an air pressure line 25. The feed lines 16 are inserted in the bottom of the casing and preferably welded thereto as at 17.

The oil reservoir is filled with oil by means of the opening 28, which is sealed by the plug 21. It will be seen that when air pressure is applied to the reservoir by means of the line 25, it will have a tendency to force the oil from the reservoir through the lines 16, to the bearings 15.

It has been found that the lines 16 must be kept filled with oil, and to this end I employ check valves 30. Where the bearings are above the reservoir, I place this check valve in the feed line 16 adjacent the reservoir. While where the bearings are below the reservoir, I place this check valve adjacent the bearings, thus retaining at all times a supply of oil in the line 16, preventing siphoning of the oil and the admission of air in the oil feed lines. This will cause oil to be fed to the bearing the instant pressure is applied.

The air supply found in the ordinary service station usually has a pressure of two hundred pounds upward. It is evident that if this great pressure was applied directly to the reservoir it would tend to force a great amount of oil therefrom the instant it was applied. I therefore find it necessary to provide mechanism whereby this pressure may be controlled and only a predetermined pressure be applied in the reservoir for a predetermined length of time.

To accomplish this, I provide the pressure control apparatus 30, which consists of housing 40 having vent openings 41. This housing 40 contains a three way valve 45 inserted in the line 25 between a pressure regulator 50 and the containers 18. Normally this valve is in the position as illustrated in Fig. 3. In this position the passageway between the line 25a and the line 25b leads to a pressure regulator valve 50 which is open while the passageway 43 of the valve is closed preventing the escape of air to the atmosphere.

The pressure regulator valve 50 consists of a housing 51, having a seat 52 and a passageway 53 leading to the pressure line 25. A ball 54 is urged against the seat 52 by means of a spring 55.

The housing 50 has a cap 58 which is provided with a threaded opening to carry an adjusting screw 57 in order that the tension on the spring 55 may be regulated. The adjusting screw is provided with a knurled head 60 and a pinion 61 which meshes with a gear 62 rotatably mounted on the housing 40. The gear 62 is provided on its upper face with marks to indicate the amount of air pressure required to overcome the tension of the spring and raise the ball 54 from its seat. It is of course evident that as the head 60 of the screw 57 is rotated, it will increase or decrease the pressure on the spring 55 and at the same time cause the gear 62 to rotate, thereby indicating the resulting pressure on the ball 54.

The housing 51 of the pressure regulator is also provided with a passageway 65 which leads to a chamber 66 carrying a plunger 67 which is pivotally secured to a lever 68 which is adapted to rotate a valve member 69 of the valve 45. A spring 70 normally tends to hold the plunger 67 and the valve 45 in their normal positions.

The pressure line 25 is provided with a portion 26 threaded to receive a protecting cap 27. This construction is similar to that of the valve stem employed in automobile tires, thereby adapting the lubricating system for use with the same pressure hose connection found in service stations for use on the tires. It will be seen that as the air pressure is applied on the line 26, it will act against the ball 54 of the regulating member, and also through the valve 45, against the oil in each of the reservoirs.

When the pressure reaches a predetermined amount, which amount is gauged by the pressure on the ball 54, it will force the ball from its seat, thereby permitting the passage of air to the chamber 66, forcing the plunger 67 against the spring 70. The plunger carries the link 68 to the right as shown in Fig. 3 in dotted lines, thereby turning the valve 45 to a position shown in Fig. 4. In this position the valve member 69 has the portion 25a of the line 25 to the atmosphere opened thereby relieving the pressure from the reservoirs 18. At the same time the valve has cut the communication between the portion 25a and 25b of the line 25 by closing the line 25b at the valve 45. Therefore the pressure is maintained on the line 25b and the pressure valve 50 will retain the valve 45 in the position shown in Fig. 4 thereby maintaining the reservoirs 18 open to atmospheric pressure until the source of pressure is removed from the line 25.

The construction is such that the pressure is applied to the reservoirs from the time of application of pressure to the line 25 until a predetermined pressure is reached, at which time the valve 45 is operated to open the reservoirs to atmospheric pressure. The length of time during which pressure is applied to the reservoirs is dependent upon the tension of the spring 70 and the degree of pressure applied at the source. However, as the pressure lines of the service station seldom vary to any great extent, it is found that the pressure is applied to the reservoirs 18 for substantially a predetermined length of time, which is dependent upon the tension of the spring 70 and the size of the cylinder 66.

From the foregoing description it is apparent that I have provided a lubrication system which can readily utilize the air systems found in automobile service stations for its source of energy. Also that I have provided a device by means of which the pressure of the oil may be regulated and restricted to a substantially specific interval of time.

I claim:

1. In a lubricating system, the combination of a plurality of oil supply reservoirs, means for simultaneously pneumatically transmitting pressure to the oil in the reservoirs, oil supply lines leading from the reservoirs for connecting the reservoirs to bearing mechanisms to be lubricated and means associated with said pressure transmitting means to open the reservoirs to atmospheric pressure after a predetermined pressure is reached therein, said means being effective to maintain said reservoirs open to atmospheric pressure as long as a source of pneumatic pressure remains connected to the system.

2. In a lubricating system, the combination of a plurality of oil supply reservoirs, means for simultaneously introducing air under pressure into the reservoirs, oil supply lines leading from the reservoirs for connecting the reservoirs to bearings, and a valve associated with said pressure means adapted to shut off the pressure from the reservoirs when a predetermined pressure is reached, and means to return the valve to normal position.

3. In a lubricating system, the combination of a plurality of oil supply reservoirs, oil supply lines adapted to carry oil to bearings, an air pressure transmitting line connecting said reservoirs and means interposed in the pressure line to open the reservoirs to atmospheric pressure, when a predetermined limit is reached and means whereby the pressure limit may be regulated.

4. In a lubricating system, the combination of an oil supply reservoir, oil supply lines leading from said supply reservoir and adapted to carry oil to bearings, an air pressure line connected to the reservoir, one end of said air pressure line being adapted to be connected to the air line of a service station, and means to open said reservoirs to atmospheric pressure when a pre-determined pressure within the air pressure line is reached, said means being effective to maintain said reservoirs open to atmospheric pressure as long as a source of pneumatic pressure remains connected to the system.

5. In a lubricating system, the combination of an oil supply reservoir, oil supply lines leading from said reservoir and adapted to carry oil to bearings, an air pressure line connected to the reservoir and means interposed in the pressure line, to open the reservoir to atmospheric pressure when a predetermined pressure is reached in said air pressure line, and to maintain the pressure upon the reservoir at atmospheric as long as air pressure is exerted upon the air line, said means comprising a pressure valve in the air line adapted to open at a predetermined pressure and a three-way valve interposed in the air line between the pressure valve and said reservoir, said three-way valve being adapted to close the air pressure line between the said pressure valve and said reservoir and at the same time to open the line beyond the shut-off to the atmosphere, and means associated with the pressure valve to so operate the three-way valve as long as more than a predetermined amount of air pressure is exerted upon the air line.

6. In a lubricating system, the combination of a plurality of oil supply reservoirs, oil supply lines adapted to carry oil to bearings, an air pressure line connecting all the reservoirs and means interposed in the pressure line to open the reservoirs to atmospheric pressure when a predetermined pressure is reached in said pressure line.

7. In a lubricating system, the combination of an oil supply reservoir, an oil supply line leading from the reservoir to a bearing, means for inducing fluid pressure in the reservoir, said pressure increasing from atmospheric level to a predetermined point, and means for reducing said pressure to atmospheric level immediately after the predetermined point is reached.

8. In a lubricating system, the combination of an oil supply reservoir, an oil supply line leading from the reservoir to a bearing, means for intermittently increasing pneumatic pressure in the reservoir from atmospheric level to a predetermined point, and means for suddenly reducing said pressure to atmospheric level after the predetermined point is reached.

9. In a lubricating system, the combination of an oil supply reservoir, an oil supply line leading from the reservoir to a bearing, means for connecting a source of substantially constant pneumatic pressure to the reservoir, means for disconnecting the source from the reservoir when the pressure therein has reached a predetermined point, and means for thereafter reducing the pressure in the reservoir to atmospheric level.

In testimony whereof, I hereunto affix my signature.

HENRY CHISHOLM.